US006736981B2

(12) United States Patent
Gomez et al.

(10) Patent No.: US 6,736,981 B2
(45) Date of Patent: May 18, 2004

(54) PARTICULATE POLYMERS AS FILTER AIDS

(75) Inventors: Marcos Gomez, Heidelberg (DE);
Tilman C Rock, Sinsheim (DE);
Helmut Meffert, Ludwigshafen (DE);
Axel Sanner, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 36 days.

(21) Appl. No.: 10/076,515

(22) Filed: Feb. 19, 2002

(65) Prior Publication Data

US 2002/0153331 A1 Oct. 24, 2002

(30) Foreign Application Priority Data

Feb. 21, 2001 (DE) .......................... 101 08 386

(51) Int. Cl.$^7$ .................................. C02F 1/00
(52) U.S. Cl. .......................... 210/777; 210/733; 426/7; 426/422; 426/495
(58) Field of Search ............... 210/692, 725, 210/727, 728, 733, 734, 777, 778; 426/7, 422, 495

(56) References Cited

U.S. PATENT DOCUMENTS

| 4,344,846 | A | | 8/1982 | Klein ......................... 210/503 |
|---|---|---|---|---|
| 4,658,002 | A | | 4/1987 | Tschang et al. ............. 526/264 |
| 4,764,588 | A | * | 8/1988 | Smith et al. ................. 528/481 |
| 5,262,053 | A | * | 11/1993 | Meier ......................... 210/636 |
| 6,117,459 | A | * | 9/2000 | Van Den Eynde et al. ..... 426/7 |
| 6,525,156 | B1 | * | 2/2003 | Ernst et al. ................. 526/347 |

FOREIGN PATENT DOCUMENTS

| DE | 199 20 944 | 11/2000 |
|---|---|---|
| EP | 483 099 | 4/1992 |
| WO | WO 96/35497 | 11/1996 |

* cited by examiner

Primary Examiner—Peter A. Hruskoci
(74) Attorney, Agent, or Firm—Keil & Weinkauf

(57) ABSTRACT

The use is described of particulate, water-insoluble and scarcely swellable polymers of ethylenically unsaturated monomers, which polymers contain, copolymerized, at least 20% by weight, based on the total weight of the monomers, of at least one $\alpha,\beta$-monoethylenically unsaturated monocarboxylic acid having from 3 to 6 carbons as filter aid for filtering aqueous liquids. Subject-matter of the invention are also water-insoluble, scarcely swellable polymers (popcorn polymers) that contain, copolymerized, $\alpha,\beta$-monoethylenically unsaturated carboxylic acids and styrene or styrene derivatives, and also a process for their preparation.

7 Claims, No Drawings

PARTICULATE POLYMERS AS FILTER AIDS

The present invention relates to the use of particulate, water-insoluble and scarcely swellable polymers based on ethylenically unsaturated monomers as filter aids for filtering aqueous liquids, and to novel particulate, water-insoluble and scarcely swellable copolymers.

Separating solid-liquid mixtures by filtration is an important process step in many industrial production processes. In particular when aqueous liquids are filtered, filter aids are frequently used. Filter aids are particulate, for example granulated, pulverulent or fibrous substances which, depending on the type and amount of solids present in the liquid to be filtered, make it possible for a filter cake to build up or are intended to loosen this.

The action of the filter aids is based on developing capillaries in the filter cake which, firstly, are small enough to retain solids, but secondly are numerous enough in order to facilitate the outflow of the liquid phase. For this purpose, the filter aid can be added to the suspension to be filtered (pulp) and/or the filter aid can be applied before the filtration as an auxiliary layer on the filter surface. In precoat filtration, for example before the start of filtration, a filter aid precoat is applied to a support surface. The filter aid is then added to the pulp, preferably continuously. During the filtration, a loose filter cake of filter aid thus forms, which retains the pulp solids, so that the liquid dispersion medium can flow off as clear filtrate (see also "Roempp Chemielexikon" [Roempp's chemistry lexicon], 9th edition, Georg Thiemer Verlag Stuttgart, pp. 1357 ff. and C. Alt in Ullmann's Encyclopedia of Industrial Chemistry, 5th ed. on CD-ROM, "Filtration", especially Chapter 4 "Deep-Bed Filtration" and Chapter 11 "Filter Aids" for the terms filter aid and filtration).

Obviously, the filter aids should be chemically inert and insoluble in the pulp to be filtered. In addition, under the action of pressure they should not deform, so that the pores in the filter cake do not collapse. Furthermore, it is desirable that the filter aids can be regenerated.

The most customary filter aids, in addition to organic substances such as cellulose, wood charcoal and wood powder, comprise inorganic materials, in particular of silicate nature, such as kieselguhr, pearlites, diatomaceous earths and bentonites. However, these materials have the disadvantage that they cannot be regenerated and therefore must be disposed of.

In the drinks industry especially, there is a great requirement for filter aids for aqueous liquids, since fruit juice drinks and fermented beverages such as beer are frequently subjected to filtration. A filter aid frequently used in the drinks industry is kieselguhr. In the production of beer, for example, from 150 to 200 g of filter aid, in particular kieselguhr, are required per hl of beer. Since the filtering action of these filter aids decreases after a certain time, they must be removed and, in the case of the non-regenerable filter aids, disposed of, which obviously is associated with high costs. In addition, a carcinogenic action of the kieselguhr used in the drinks industry is currently a subject of discussion.

There has therefore been no lack of attempts to provide synthetic filter aids. U.S. Pat. No. 4,344,846, for example, describes the use of expanded polystyrene in precoat filtration.

WO96/35497 and EP483099 describe filter aids for precoat filtration which are based on spherical, incompressible polymers, for example polyvinylpyrrolidone or Nylon 11, which form a filter cake having a porosity in the range from 0.3 to 0.5.

EP-A 177812 discloses highly crosslinked, scarcely swellable, pulverulent popcorn polymers based on N-vinylpyrrolidone which can be used as filter aids.

DE-A 19920944 describes insoluble, scarcely swellable popcorn polymers based on styrene and N-vinyllactams. The use of these popcorn polymers as filter aids is proposed.

The synthetic filter aids based on polymers have an improved regenerability. However, their filtering action sometimes leaves something to be desired. Some of the synthetic filter aids are again less suitable for precoat filtration of aqueous liquids, since they do not sediment in water, or only sediment poorly.

It is an object of the present invention to provide filter aids for filtering aqueous liquids, which filter aids have a good filtering action and are suitable for precoat filtration. In addition, good regenerability of the filter aids is desired.

Furthermore, the filter aid should be inexpensive and producible as far as possible in a solvent-free manner.

We have found that this object is achieved, surprisingly, by particulate, water-insoluble and scarcely swellable polymers based on ethylenically unsaturated monomers, which polymers contain, copolymerized, at least 20% by weight, based on the total weight of monomers, of at least one α,β-monoethylenically unsaturated monocarboxylic and/or dicarboxylic acid having from 3 to 6 carbons. The present invention therefore relates to the use of such polymers as filter aids for filtering aqueous liquids.

The polymers to be used inventively, despite their hydrophilicity which is due to the copolymerized acid monomers a), are virtually or completely water-insoluble and are not swollen by water, or are only swollen to a slight extent. The maximum degree of swelling $Q_{max}$ ($H_2O$) is equivalent here to the maximum percent by weight of water that is maximally absorbed by one part by weight of polymer at room temperature. Generally, $Q_{max}$ ($H_2O$) will not exceed 400%. Preferably, $Q_{max}$ ($H_2O$) is less than 100%, and in particular less than 80%.

The low water solubility and water swellability of the polymers to be used inventively are achieved by a high degree of crosslinking or high crosslinking density of the polymer chains among one another.

The content of the ethylenically unsaturated carboxylic acids, hereinafter also monomers a), in the inventive polymers is generally from 20 to 100% by weight, or, in the presence of comonomers, up to 99.9% by weight, preferably from 25 to 95% by weight, in particular from 30 to 80% by weight, and particularly preferably from 40 to 70% by weight, in each case based on the total weight of the monomers constituting the polymer. Examples of ethylenically unsaturated carboxylic acids having from 3 to 6 carbons are acrylic acid, methacrylic acid and crotonic acid as monocarboxylic acids, and maleic acid, fumaric acid and itaconic acid as dicarboxylic acids. Preferably the polymers to be used inventively contain copolymerized acrylic acid and/or methacrylic acid, with polymers that contain copolymerized acrylic acid as monomer a) being particularly preferred.

Comonomers which come into consideration are in principle all monomers that can be copolymerized with the ethylenically unsaturated carboxylic acids. These include, in particular, derivatives of the ethylenically unsaturated carboxylic acids, for example their alkyl esters, their amides and their hydroxyalkyl esters, vinylaromatic monomers such as styrene and styrene derivatives, N-vinylamides and N-vinyl nitrogen heterocycles, and crosslinking monomers, that is to say a compound having at least 2 nonconjugated ethylenically, unsaturated double bonds.

The content of comonomers in the monomers constituting the polymer is, where present, generally in the range from 0.1 to 80% by weight, preferably from 5 to 75% by weight, in particular in the range from 20 to 70% by weight, and particularly preferably in the range from 30 to 60% by weight.

Examples of derivatives of ethylenically unsaturated carboxylic acids are: amides such as acrylamide, methacrylamide, alkyl esters preferably having from 1 to 18 carbons in the alkyl moiety, for example methyl acrylate, ethyl acrylate, n-propyl acrylate, isopropyl acrylate, n-butyl acrylate, 2-butyl acrylate, isobutyl acrylate, tert-butyl acrylate, n-hexyl acrylate, 2-ethylhexyl acrylate, lauryl acrylate and stearyl acrylate, methyl methacrylate, ethyl methacrylate, n-propyl methacrylate, isopropyl methacrylate, n-butyl methacrylate, 2-butyl methacrylate, isobutyl methacrylate, tert-butyl methacrylate, n-hexyl methacrylate, 2-ethylhexyl methacrylate, lauryl methacrylate and stearyl methacrylate; hydroxyalkyl esters preferably having from 2 to 4 carbons in the hydroxyalkyl moiety, for example hydroxyethyl acrylate, 2- and 3-hydroxypropyl acrylate, 2- and 4-hydroxybutyl acrylate, hydroxyethyl methacrylate, 2- and 3-hydroxypropyl methacrylate, 2- and 4-hydroxybutyl methacrylate.

Examples of N-vinylamides, and N-vinyl nitrogen heterocycles are: N-vinyllactams such as N-vinylpyrrolidone, N-vinylpiperidone, N-vinylcaprolactam, vinyl-substituted nitrogen heteroaromatics such as N-vinylimidazole, N-vinyl-2-methylimidazole, N-vinyl-4-methylimidazole and N-vinylamides of aliphatic carboxylic acids such as N-vinylformamide and N-vinylacetamide.

Examples of suitable styrene derivatives are: alkylstyrenes such as vinyltoluene, tert-butylstyrene, sulfone-containing styrenes such as styrene-3-sulfonic acid and sodium styrene-3-sulfonate and amino-containing styrenes, for example styrenes that bear the following substituents in the 3 position: —$CH_2N(CH_3)_2$, —$CH_2NHCH_3$, —$CH_2NH_2$, —$[CH_2N(CH_3)_3]^+Cl^-$, —$[CH_2N(CH_3)_2CH_2CH_2OH]^+Cl^-$. The abovementioned styrene derivatives are known, inter alia, as monomers for preparing ion-exchange resins. Styrene and mixtures of styrene with styrene derivatives are preferred as comonomers.

Examples of crosslinking monomers are: alkylenebisacrylamides such as methylenebisacrylamide and N,N'-acryloylethylenediamine, N,N'-divinylureas such as N,N'-divinylethyleneurea, N,N'-divinyl-propyleneura, in addition ethylidenebis-3-(N-vinylpyrrolidone), N,N'-divinyldiimidazolyl(2,2')butane and 1,1'-bis(3,3'-vinylbenzimidazolid-2-one) 1,4-butane, alkylene glycol di(meth)acrylates such as ethylene glycol diacrylate, ethylene glycol dimethacrylate, tetraethylene glycol acrylate, tetraethylene glycol dimethacrylate, diethylene glycol acrylate, diethylene glycol methacrylate, aromatic divinyl compounds such as divinylbenzene and divinyltoluene and vinyl acrylate, allyl acrylate, allyl methacrylate, divinyldioxane and pentaerythritol triallyl ether. Preferred crosslinkers are alkylene glycol di(meth)acrylates, N,N'-divinylureas and N,N'-divinylaromatics, in particular ethylene glycol diacrylate, ethylene glycol dimethacrylate, N,N'-divinylbenzene, N,N'-divinylethyleneurea (=N,N'-divinylimidazolidin-2-one).

The content of crosslinking monomers is frequently from 0.1 to 10% by weight, preferably from 0.2 to 8% by weight, and in particular from 0.5 to 5% by weight, based on the total weight of the monomers constituting the polymer.

Inventively preferred polymers contain, copolymerized,
a) from 20 to 98.9% by weight, in particular from 25 to 89.8% by weight, particularly preferably from 30 to 79.5% by weight, and very particularly preferably from 39.5 to 70% by weight, of at least one α,β-monoethylenically unsaturated monocarboxylic acid having from 3 to 6 carbons, in particular acrylic acid and/or methacrylic acid, and particularly preferably acrylic acid, b) from 1 to 79.9% by weight, in particular from 10 to 74.8% by weight, particularly preferably from 20 to 69.5% by weight, and very particularly preferably from 29.5 to 60% by weight, of styrene and/or at least one monounsaturated styrene derivative, preferably styrene or a mixture of styrene with at least one styrene derivative, and particularly preferably styrene, c) from 0.1 to 10% by weight, in particular from 0.2 to 8% by weight, and particularly preferably from 0.5 to 5% by weight, of at least one monomer c) having at least 2 nonconjugated, ethylenically unsaturated double bonds, with or without d) from 0 to 40% by weight, preferably from 0 to 20% by weight, and in particular from 0 to 10% by weight, of one or more monomers d) that are different from the monomers a) to c), preferably of an N-vinyllactam, with the percentages by weight of the individual components a) to d) totaling 100%. Such polymers are novel and are also subject matter of the present invention.

In particularly inventively preferred embodiments, the polymer contains, copolymerized:
a) from 20 to 89.8% by weight, in particular from 30 to 79.5% by weight, and particularly preferably from 39.5 to 70% by weight, of acrylic acid, b) from 10 to 74.8% by weight, in particular from 20 to 69.5% by weight, and particularly preferably from 29.5 to 60% by weight, of styrene or a mixture of styrene and at least one monounsaturated styrene derivative, c) from 0.2 to 8% by weight, in particular from 0.5 to 5% by weight, of at least one monomer c), selected from alkylene glycol di(meth)acrylates, N,N'-divinylureas and N,N'-divinylaromatics, with or without d) from 0 to 10% by weight, in particular from 0 to 5% by weight, of one or more N-vinyllactams, in particular N-vinylpyrrolidone, with the percentages by weight of the individual components a) to d) totaling 100%.

The water-insoluble and scarcely swellable polymers to be used according to the invention can be prepared on the basis of known processes for preparing highly crosslinked polymers.

The high density of crosslinking of these polymers can be achieved, firstly, by using in the preparation of the polymers a monomer mixture that comprises relatively large amounts of monomers having a crosslinking action, for example diethylenically or polyethylenically unsaturated monomers. A high density of crosslinking can also be achieved by carrying out the polymerization under reaction conditions that lead to the formation of additional centers of polymerization on the still-growing polymer chain and thus cause branching and crosslinking of the polymer chains among one another.

Preferably, the inventive polymers are prepared by polymerizing the monomers a), with or without b), c) and d) in the absence of oxygen and polymerization initiators. Absence of oxygen means that the oxygen concentration in the reaction medium is kept as low as possible by inertization measures. Small traces of oxygen can generally be tolerated. Absence of polymerization initiators means that the concentration of polymerization initiators is markedly below the initiator concentration that is usually required to initiate a free-radical solution polymerization or solvent-free polymerization reaction. Usually, the polymerization is carried out in the absence of externally added initiators. Small amounts of initiators can be tolerated, however. They are preferably less than 0.1% by weight, and in particular less than 0.05% by weight, based on the total amount of the monomers to be polymerized. Those skilled in the art take polymerization initiators to mean compounds that decompose under the action of heat or high-energy radiation, forming free radicals, and thus initiate free-radical polymerization. Examples of polymerization initiators are azo compounds, for example AIBN and comparable compounds, organic and inorganic peroxides and hydroperoxides, peroxo acids and their salts and customary photoinitiators. It is suspected that the absence of oxygen and polymerization initiators intensifies branching and crosslinking reactions in the growing polymer chain.

The monomers forming the polymer can be polymerized in solvent-free polymerization, solution polymerization or precipitation polymerization, or in a powder bed in the presence of a heat-transfer medium.

To remove residual traces of oxygen, carrying out the polymerization in the presence of at least one reducing agent has become established. Suitable compounds are in principle all compounds that bind oxygen. These include, in particular, salts of sulfurous and hyposulfurous acid, dithionites such as sodium sulfite, sodium pyrosulfite, sodium dithionite, and in addition ascorbic acid or mixtures of the abovementioned reducing agents. Preferably, the reducing agents are used in an amount of from 0.01 to 2% by weight, in particular from 0.05 to 1% by weight, based on the monomers to be polymerized. Oxygen is also successfully removed from the reaction mixture by carrying out the polymerization under a reduced pressure, so that the reaction mixture boils at the chosen polymerization temperature. It has proved useful here, in addition, to pass a stream of nitrogen through the polymerization mixture. Obviously, two or more of these measures can also be employed together.

The polymerization, depending on the reactivity of the monomers to be polymerized and the type of polymerization process, takes place at polymerization temperatures customarily in the range from 20° C. to 220° C., preferably in the range from 50° C. to 200° C., in particular in the range from 70° C. to 150° C. In the case of solvent-free polymerization, generally, higher reaction temperatures, for example from 100° C. to 220° C., are required than in the case of solution polymerization or precipitation polymerization, which proceed at a satisfactory rate even at temperatures up to 100° C. Obviously, for solution polymerization, even high temperatures, for example up to 150° C., can be employed. If necessary, the polymerization is then carried out in pressure vessels. Depending on the type of monomers used and on the temperature selected, the polymerization time is from 0.2 to 20 h, preferably from 0.5 to 15 h.

The particulate polymers to be used according to the invention are preferably popcorn polymers. The term popcorn polymer denotes foam-like crusty polymer grains having cauliflower-like morphology. Popcorn polymers have a high degree of crosslinking. Because of their high crosslinking, popcorn polymers are generally insoluble and virtually unswellable. Popcorn polymers in addition have the property that, on contact with the monomers of which they consist, or with other monomers, they can convert them into popcorn polymers. In other words they act as a seed for popcorn polymerization.

In the prior art, various processes for popcorn polymerization have been described, for example in DE-A 2255263, U.S. Pat. Nos. 2,341,175, 3,277,066, Houben-Weyl, volume 14, Makrom. Stoffe [Macromolecular Substances], part 1, page 98 (1961), Ullmanns Encyklopädie der Techn. Chemie [Ullmann's Encyclopedia of Industrial Chemistry], 4th edition, volume 19, page 385 (1980), EP-A 88964 and EP-A 177812. These processes can be used in a similar manner to prepare the polymers used according to the invention.

The popcorn polymers are generally prepared, that is to say popcorn polymerization is generally carried out, as described above by polymerizing the monomers constituting the polymer in the absence of oxygen and polymerization initiators, and in particular in the presence of a reducing agent for oxygen. The aforementioned applies with respect to reaction temperatures and polymerization time. In addition it has proven useful to accelerate the polymerization by adding small amounts of alkali, for example sodium hydroxide or potassium hydroxide. The alkali is frequently added in an amount of from 0.05 to 2% by weight, and preferably from 0.1 to 1% by weight, based on the monomers to be polymerized.

Popcorn polymerization can be carried out as solvent-free polymerization, solution polymerization or precipitation polymerization, or as polymerization in a powder bed.

In particular it has proven useful to start the polymerization with the formation of a popcorn polymer as polymerization seed and then to continue the polymerization by adding further monomers. To prepare the polymerization seed, a procedure is preferably followed such that a mixture of from 99.5 to 95% by weight of at least one monoethylenically unsaturated monomer, preferably an N-vinyllactam d), in particular N-vinylpyrrolidone, and from 0.5 to 5% by weight of at least one monomer c) is first subjected to popcorn polymerization conditions. The amount of the monomers forming the seed is preferably from 0.1 to 10% by weight, and in particular from 0.2 to 5% by weight, of the total amount of monomer.

Preference is given to a procedure, for example, in which the popcorn polymerization is started by heating the above mixture of the monomers forming the seeds, preferably N-vinyllactam and monomer c), in a suitable solvent to a temperature of from 50° C. to 150° C. in the absence of oxygen and polymerization initiators. This polymerization is accelerated in particular by the presence of small amounts of sodium hydroxide solution or potassium hydroxide solution. Within a short time a polymerizable popcorn polymer forms that, on addition of the remaining monomer mixture, that is to say in particular monomers a), b) and c), starts the popcorn polymerization of these monomers without an induction period. In addition, it is possible to transfer the polymerizable popcorn polymer into a receiving vessel that contains the monomer and crosslinker, or into which monomer and crosslinker are then added.

Popcorn polymerization can also be carried out without solvent as solvent-free polymerization. In this case the monomers to be polymerized are inertized by introducing nitrogen and are then heated to a temperature in the range from 20 to 200° C., preferably from 100 to 200° C., particularly preferably from 150 to 180° C. It is advantageous to continue to pass a gentle nitrogen stream through the polymerization mixture even during the polymerization. Oxygen is also excluded by polymerizing the monomers under reduced pressure so that the monomers boil. In this case the polymer is produced as powder. The popcorn polymer is obtained therefrom in yields of greater than 90% in the form of a powder having a mean particle size of from about 10 $\mu$m to 5 mm, prferably from 10 $\mu$m to 500 $\mu$m.

For preparing popcorn polymers, precipitation polymerization in water or aqueous solvents is preferred. The aqueous solvents may contain other water-miscible solvents, the content of these solvents generally being less than 50% by volume, in particular less than 20% by volume. Preferably, water is the sole solvent. Examples of water-miscible solvents are $C_1$–$C_4$ alcohols such as methanol, ethanol, n-propanol, isopropanol and tert-butanol, ketones such as acetone or methyl ethyl ketone, dimethyl sulfoxide.

The precipitation polymerization can be carried out both using the above-described seeding technique and also without specific seed formation (induction period).

The polymerization temperature can be varied within a broad range, for example from about 50 to 200, preferably from 70 to 150° C. The use of reducing agents for removing oxygen is also preferred here. Alternatively, or additionally, an inert gas stream is frequently passed through the aqueous polymerization medium.

The concentration of the monomers is expediently selected in such a manner that the reaction mixture can easily be stirred over the entire reaction period. In order to carry out the reaction in customary stirred tanks, monomer concentrations preferably less than 50% by weight, in particular less than 40% by weight, particularly preferably from about 5 to 30% by weight, and especially from 10 to 20% by weight, are selected, based on the aqueous mixture. If more powerful agitators are available, the monomer concentration of the aqueous solution can also be greater than 50% by weight.

In some cases it can be expedient to start the popcorn polymerization using a relatively concentrated solution and then to add water in the course of the reaction for dilution. The popcorn polymerization is preferably started at pHs above 8. The pH can be adjusted by adding small amounts of bases such as sodium hydroxide or ammonia or the customary buffer salts such as soda, sodium hydrogen carbonate or sodium phosphate.

In a particularly preferred embodiment of the precipitation polymerization, a water-soluble comonomer, preferably an N-vinyllactam, a portion of the crosslinker c), water and if appropriate a buffer and a reducing agent are heated in a gentle nitrogen current until the first polymer particles form. The aforementioned applies to the ratio of comonomer to crosslinker. The amount of the monomers forming the seeds is preferably from 0.1 to 10% by weight, and in particular from 0.2 to 5% by weight, of the total amount of monomer. Then a mixture of, in particular, monomers a), if appropriate b), c) and d), and if appropriate water as diluent, which mixture has been inertized in advance by blowing in nitrogen, is added in the course of from 0.2 to 10 hours. The monomers a), b) and c) can also be dissolved in a water-miscible solvent. This procedure has the advantage that the popcorn polymerization only requires a relatively short time.

If appropriate, after the polymerization, a purification process is further carried out to remove volatile components, for example steam distillation of the aqueous suspension.

The popcorn polymers are produced in precipitation polymerization in the aqueous state as an aqueous suspension at a yield of generally from at least 70 to >99%, based on the monomers used. The polymers can be isolated from the aqueous suspension by filtering or centrifuging, preferably with subsequent washing with water and drying in customary dryers such as a forced-air circulation drying cabinet or vacuum drying cabinet, rotary dryers with flights, or pneumatic conveyor dryers.

The popcorn polymers thus obtainable are practically insoluble in water and all solvents and also swell therein only slightly.

The above described insoluble scarcely swellable polymers, in addition to being used as filtration aids, can also be used as adsorbents, ion exchangers and support materials. In particular, they are suitable as filter aids, since, in comparison with other filter aids based on polymers, they are distinguished by improved sedimentation behavior with at least the same or improved filtration efficiency. In addition, they are chemically inert and do not have disadvantageous effects on the liquids to be filtered.

It is well understood that the polymers described above, hereinafter also referred to as polymer powders, can be used together with conventional particulate filter aids of prior art for filtering aqueous liquids. According to the invention, filter aids are useful which comprise the particulate polymers described above. The polymers according to the invention in general make up at least 20%, preferably at least 50% and especially at least 80%, by weight based on the total amount of filter aid. An especially preferred embodiment of the invention relates to the filter aids which contain the above described particulate, water-insoluble and scarcely swellable polymers alone or almost exclusively (>95% by weight).

The present invention thus also relates to a process for filtering aqueous liquids in the presence of the above described particulate, water-insoluble and scarcely swellable polymers, in particular to a process which is carried out by the method of precoat filtration.

The filtration processes can be carried out in a similar manner to the prior-art filtration processes described at the outset, using the above-described polymer powders as filter aid, in other words the filtration of the liquid to be filtered is performed in a commonly known manner in the presence of the above described filter aids. The inventively preferred precoat filtration is well known to a skilled person, e.g. from the references cited at the outset. Precoat filtration is frequently used for the clearing of beverages such as fruit juice, beer and wine.

In the case of precoat filtration, generally, before the start of filtration, a precoat of the filter aid to be used according to the invention is applied to a support surface, for example a sieve plate, a perforated plate, a screen or a slotted filter, a filter cloth, etc. The amount of filter aid necessary to form such a precoat may in general vary from 10 $g/m^2$ to 10 $kg/m^2$, frequently from 50 $g/m^2$ to 2 $kg/m^2$ and especially from 100 $g/m^2$ to 1 $kg/m^2$. The thickness of the resulting precoat may accordingly vary from 0.5 mm to 10 cm and preferably from 1 mm to 10 mm. The liquid to be filtered is then passed through the filter layer by applying a pressure difference, e.g. by applying a vacuum to the filtrate and/or pressure to the pulp, with further filter aid to be used according to the invention preferably being added as filter aid to the liquid to be filtered during the filtration operation.

For precoat filtration, any filter apparatus known to a skilled person can be used in which a precoat on a support surface can be formed in the manner described above. Also, vacuum drum filters are useful. Here a thicker precoat of the inventively used filter aid having a thickness of up to 10 cm is formed on the filter medium and then the thickness of the precoat is reduced during the filtration process to some millimeters, e. g. by means of scrapers. Grequently additional filter aid is added together with the liquid to be filtered during the filtration process.

On account of their chemical inertness, the polymer powders to be used according to the invention are suitable in particular for use in the food industry, for example for filtering fruit juice drinks and fermented beverages. On account of their good filtration efficiency, the polymer powders to be used according to the invention are particularly suitable for filtering beer.

The examples below are intended to describe the invention in more detail, but without restricting it thereto.

I. Production of the Particulate Polymers (Examples 1 to 8)

EXAMPLE 1

Polymer P1

100 g of distilled water, 3 g of N-vinylpyrrolidone, 0.06 g of N,N'-divinylethyleneurea and 5 g of sodium hydroxide were heated in a stirred apparatus to 60° C., with introduction of a gentle nitrogen stream. Then, 0.2 g of sodium dithionite were added. The mixture was heated to 75° C. and held at this temperature. White flakes formed after 30 minutes. A solution of 3 g of divinylbenzene in 294 g of acrylic acid was then added uniformly in the course of 4 hours, the temperature being maintained. The white flakes were converted into a polymer suspension, which slowly became highly viscous. Starting at the same time, 2 000 ml of deionized water were added over the course of 4 h. The suspension was then further heated at 80° C. for 1 h and then cooled. The reaction mixture was first treated with steam to remove volatile constituents. The resultant viscous suspension was filtered off and washed with water to remove impurities such as soluble polymer and monomers. The moist solid was then dried under reduced pressure.

EXAMPLE 2 to 7

Polymers P2 to P7

Preparation was carried out in a similar manner to example 1. The composition of the monomer feed is given in table 1. In examples 2, 4, 5, 6 and 7, in a departure from example 1, 0.25 g of sodium hydroxide was used.

TABLE 1

| Example | Acrylic acid [g] | Styrene [g] | Divinylbenzene [g] | Yield [%] |
|---|---|---|---|---|
| 1 | 294 | 0 | 3 | 93 |
| 2 | 219 | 75 | 3 | 72 |
| 3 | 90 | 204 | 3 | 86 |
| 4 | 147 | 147 | 3 | 80 |
| 5 | 152 | 102 | 3 | 77 |
| 6 | 190 | 64 | 3 | 70 |
| 7 | 60 | 237 | 3 | 77 |

EXAMPLE 8

Polymer P8

60 g of distilled water, 180 g of acrylic acid, 7.2 g of butanediol diacrylate were heated in a stirred apparatus to 60° C., with introduction of a gentle nitrogen stream. Then 0.2 g of sodium dithionite was added. The mixture was heated to 75° C. and the temperature was maintained. After about 30 min, white flakes began to form. With increasing time a polymer suspension formed, with increasing viscosity. After 4 h, the suspension was heated to 80° C., this temperature was maintained for one hour, the suspension was cooled to room temperature, filtered, and the solids were washed with water to remove impurities such as soluble polymer and monomers. The moist solid was then dried under reduced pressure. The yield was 92%.

II. Application-oriented Testing of Polymers P1 to P8

II.1 Sedimentation in Water

Sedimentation was determined visually. For this, an aliquot of the filter aid was suspended in water by shaking, in a vertical cylinder. If more than 90% of the particles sediment, the test is rated as positive.

TABLE 2

| Filter aid | | Sedimentation in water |
|---|---|---|
| Polystyrene[1] | (C) | no |
| Polyamide[2] | (C) | no |
| Kieselguhr | (C) | yes |
| P1 | | yes |
| P2 | | yes |
| P3 | | yes |
| P4 | | yes |
| P5 | | yes |
| P6 | | yes |
| P7 | | yes |
| P8 | | yes |

C = comparison
[1]Polystyrene 158K, cold-milled and sifted
[2]Nylon 12, Vestosint type 1611, from Degussa-Hüls Table 2 confirms the good sedimentation of the inventive filter aids and thus their suitability for precoat filtration of aqueous liquids.

II.2 Filtration of a Standard Haze Solution

The filtration efficiency is determined from the clarification of a standard haze solution, that is to say a formazin suspension of defined haze. These solutions are known to those skilled in the art for characterizing filter aids for the drinks industry. The study is carried out as precoat filtration. For this, the formazin suspension containing the inventive filter aid was filtered in accordance with the EBC test at a precoat pressure of 4.5 bar. After flow of 5 l, the haze was determined by the EBC method. The filtrate is considered to be clear if the EBC value is less than 1. In addition, the flow rate and pressure drop at the filter body (pressure difference before/after filter body) were measured. The inventive polymers are distinguished by a low pressure drop and high filtration rates.

During the entire test, both precoat pressure and filtration rate remained constant, which verifies the advantageous properties of the inventive filter aids (high service life).

The studies below were carried out with the polymer powders FH4 to FH6 from II.

TABLE 3

Filtration tests

| Polymer | Flow rate [l/h] | Pressure drop $\Delta p$ [bar] | EBC haze (after 5 l) |
|---|---|---|---|
| P1* | 2 | 0.2 | 0.34 |
| P3 | 34 | 0 | 0.43 |
| P4 | 20 | 0 | 0.50 |
| P7 | 34 | 0 | 0.45 |

*Tests were carried out in another apparatus. To this extent, the flow rate values are not comparable.

We claim:

1. A method for filtering aqueous liquids, which comprises carrying out the filtration of the aqueous liquid in the presence of a filter aid, wherein the filter aid comprises at least one particulate, water-insoluble and scarcely swellable polymer of ethylenically unsaturated monomers, which contains, copolymerized, at least 20% by weight, based on the total weight of the monomers, of at least one α,β-monoethylenically unsaturated monocarboxylic acid having from 3 to 6 carbons.

2. The method as claimed in claim 1, wherein the ethylenically unsaturated carboxylic acid is selected from the group consisting of acrylic acid, methacrylic acid and their mixtures.

3. The method as claimed in claim 1, wherein the polymer contains, copolymerized,
   a) from 25 to 98.9% by weight of at least one α,β-monoethylenically unsaturated monocarboxylic acid having from 3 to 6 carbons as monomer a),
   b) from 1 to 79.9% by weight of styrene and/or at least one monounsaturated styrene derivative as monomer b),
   c) from 0.1 to 10% by weight of at least one monomer c) having at least 2 nonconjugated, ethylenically unsaturated double bonds, with or without
   d) from 0 to 40% by weight of one or more monomers d) that are different from monomers a) to c),
with the percentages by weight of the individual components
   a) to d) totaling 100%.

4. The method as claimed in claim 1, wherein the polymer contains, copolymerized,
   a) from 25 to 89.8% by weight of acrylic acid,
   b) from 10 to 74.8% by weight of styrene or a mixture of styrene and at least one monounsaturated styrene derivative,
   c) from 0.2 to 8% by weight of at least one monomer c), selected from alkylene glycol di(meth)acrylates, N,N'-divinylureas and N,N'-divinylaromatics, with or without
   d) from 0 to 10% by weight of one or more N-vinyllactams,
with the percentages by weight of the individual components
   a) to d) totaling 100%.

5. The method as claimed in claim 1, wherein the polymer is a popcorn polymer.

6. The method as claimed in claim 1, wherein the amount of precoat on the support surface ranges from 10 g/m$^2$ to 10 kg/m$^2$.

7. The method as claimed in claim 1, wherein the liquid to be filtered is a fruit juice drink or fermented beverage.

* * * * *

UNITED STATES PATENT AND TRADEMARK OFFICE
CERTIFICATE OF CORRECTION

PATENT NO.    : 6,736,981 B2
DATED         : May 18, 2004
INVENTOR(S)   : Gomez et al.

It is certified that error appears in the above-identified patent and that said Letters Patent is hereby corrected as shown below:

Column 11,
Line 1, "20%" should be -- 25% --;
Line 4, after "3 to 6 carbons" insert:
-- , wherein the polymer contains, copolymerized, from 0.1 to 10% by weight of at least one compound having at least 2 nonconjugated, ethylenically unsaturated double bonds, and the filtration is carried out as precoat filtration, wherein a precoat is formed on a support surface by applying an aqueous suspension of the filter aid, comprising the particulate, water-insoluble and scarcely swellable polymer to the support surface and removing aqueous liquid by a pressure difference; and the aqueous liquid to be filtered is filtered through the precoat by applying a pressure difference through the precoat --

Signed and Sealed this

Seventh Day of June, 2005

JON W. DUDAS
*Director of the United States Patent and Trademark Office*